(12) United States Patent
Kim

(10) Patent No.: US 7,506,082 B2
(45) Date of Patent: Mar. 17, 2009

(54) DATA TRANSFERRING SYSTEM USING USB AND METHOD THEREOF

(75) Inventor: Ji-Hyung Kim, Seoul (KR)

(73) Assignee: LG Electronic Inc., Seoul (KR)

( * ) Notice: Subject to any disclaimer, the term of this patent is extended or adjusted under 35 U.S.C. 154(b) by 372 days.

(21) Appl. No.: 10/896,052

(22) Filed: Jul. 22, 2004

(65) Prior Publication Data

US 2005/0021892 A1    Jan. 27, 2005

(30) Foreign Application Priority Data

Jul. 23, 2003    (KR) ...................... 10-2003-0050716

(51) Int. Cl.
*G06F 3/00* (2006.01)

(52) U.S. Cl. .............. 710/48; 710/29; 710/46

(58) Field of Classification Search ........................ None
See application file for complete search history.

(56) References Cited

U.S. PATENT DOCUMENTS

| | | | | |
|---|---|---|---|---|
| 3,979,732 A | * | 9/1976 | Hepworth et al. | 710/108 |
| 4,024,505 A | * | 5/1977 | Sperling | 710/2 |
| 4,756,010 A | * | 7/1988 | Nelson et al. | 375/354 |
| 5,150,465 A | * | 9/1992 | Bush et al. | 710/14 |
| 5,574,894 A | * | 11/1996 | Iles et al. | 713/500 |
| 6,266,715 B1 | | 7/2001 | Loyer et al. | 710/22 |
| 6,675,305 B1 | * | 1/2004 | Mohammad | 713/322 |
| 6,871,252 B1 | * | 3/2005 | Cline | 710/313 |
| 2002/0156952 A1 | | 10/2002 | Shono | 710/104 |
| 2002/0174168 A1 | * | 11/2002 | Beukema et al. | 709/201 |
| 2003/0204652 A1 | * | 10/2003 | Saito et al. | 710/33 |

FOREIGN PATENT DOCUMENTS

JP    2002-215567    8/2002
KR    1020020079536   10/2002

OTHER PUBLICATIONS

Daniel P. Bovet & Marco Cesati, Understanding the Linux Kernel, Oct. 2000, O'Reilly, parts 1-4.*

* cited by examiner

*Primary Examiner*—Eron J Sorrell
(74) *Attorney, Agent, or Firm*—KED & Associates LLP

(57) ABSTRACT

Data is transferred from a terminal to a computer over a USB cable. This is accomplished when the terminal transmits a control signal to the computer through a control line of a USB cable based on a value stored in a terminal register unit. The computer receives the control signal, sets a value of the computer register unit, and generates an interrupt according to the value in the computer register unit. The computer executes a USB reception thread that receives data from the terminal. By controlling an operation of the USB reception thread of the computer through the control line and each register unit, a load applied to a kernel of the computer can be reduced.

20 Claims, 3 Drawing Sheets

DATA TRANSFERRING SYSTEM USING USB AND METHOD THEREOF

BACKGROUND OF THE INVENTION

1. Field of the Invention

The present invention generally relates to a data transferring system, and more particularly to a system and method for transferring data using a universal serial bus (USB).

2. Background of the Related Art

In order to transfer data from a mobile terminal to a computer, a cable has been used to connect a data port of the terminal to a USB port of the computer. The computer receives the data stored in the terminal by performing programs for driving transfer of the data.

FIG. 1 shows a system for transferring data between a mobile terminal and computer in accordance with the related art. The system comprises a terminal 1 containing a data port, a cable 2 for connecting the terminal to a computer, and a computer 3 having a USB port and a program for receiving data stored in the terminal through the cable. The USB cable is composed of a VBUS line for supplying a power, a D+ line and a D− line for transmitting and receiving data, and a ground line (GND).

A data transfer process between the terminal and computer will now be explained. First, the USB cable is connected at one end to the data port at terminal 1 and the USB port of the computer 3 at the other end. The computer 3 executes a program (such as PC sync) for initiating transfer of the data stored in the terminal through the USB cable. If data is transmitted from the terminal, the computer receives the data by operating a USB reception thread (Rx Thread).

When the computer executes a data receiving program and the terminal transmits data to the computer through the USB cable, data input time from the terminal to the computer cannot be predicted. Even if there is data to be transmitted to the computer from the terminal, if the USB reception thread of the computer is not operated, the computer cannot receive data. That is, the computer has to certify whether data to be transmitted from the terminal exists by frequently operating a reception register. If there is data to be transmitted from the terminal, the computer has to continuously and speedily operate the USB reception thread for storing the data in a temporal buffer in order to receive the data.

The thread has a performance time which corresponds to the manner in which time is divided under a control of a kernel. The thread also has a priority and is scheduled by the priority to be performed. Therefore, if the USB reception thread is continuously performed with high priority, threads of other programs performed in the computer have less performance time. As a result, the performance speed of other programs including threads, except the USB reception thread, becomes low therein causing abnormal operation and further causing a problem in system stabilization such as a computer down malfunction.

SUMMARY OF THE INVENTION

An object of the invention is to solve at least the above problems and/or disadvantages and to provide at least the advantages described hereinafter.

Another object of the present invention is to provide a data transfer system and method which uses a universal serial bus (USB) to reduce the load of a computer kernel at the time of transferring data from a terminal to a computer.

To achieve these and other objects and advantages, the present invention provides in accordance with one embodiment a data transferring system using a USB comprising: a USB cable including a control line; a terminal provided with a terminal register unit, for transmitting a control signal for a data transmission to the control line by controlling the terminal register unit when data to be transmitted through the USB cable exists; and a computer provided with a computer register unit, for processing data by performing a USB reception thread (Rx Thread) by receiving the control signal from the terminal through the control line, and for transmitting a control signal informing that a data process has been finished to the control line by controlling the computer register unit when the data process is finished.

The terminal register unit is composed of: a signal line control register for transmitting a control signal to the computer through the control line of the USB cable; and a line status register for indicating a transmission status of data, and the computer register unit is composed of: a line control register for transmitting a control signal to the terminal through the control line of the USB cable; and a status register for indicating a data reception status from the terminal.

In accordance with another embodiment, the present invention provides a data transferring method using a USB comprising: setting the signal line control register and the line status register of the terminal to 1 from 0 when data to be transmitted to the computer from the terminal exists; transmitting a + signal to the computer through the control line when the signal line control register is set to be 1; toggling the status register of the computer to 1 from 0 by the transmitted + signal; generating an interrupt signal by the status register which has been toggled to be 1 and resetting the status register to 0; processing transmitted data by operating a reception thread of a program by the interruption signal; when the data process is finished, setting the line control register to 1 and resetting the line control register to 0 by transmitting a − signal to the terminal through the control line; and changing the signal line control register and the line status register into 0 by the − signal.

DETAILED DESCRIPTION OF PREFERRED EMBODIMENTS

Figure 1:
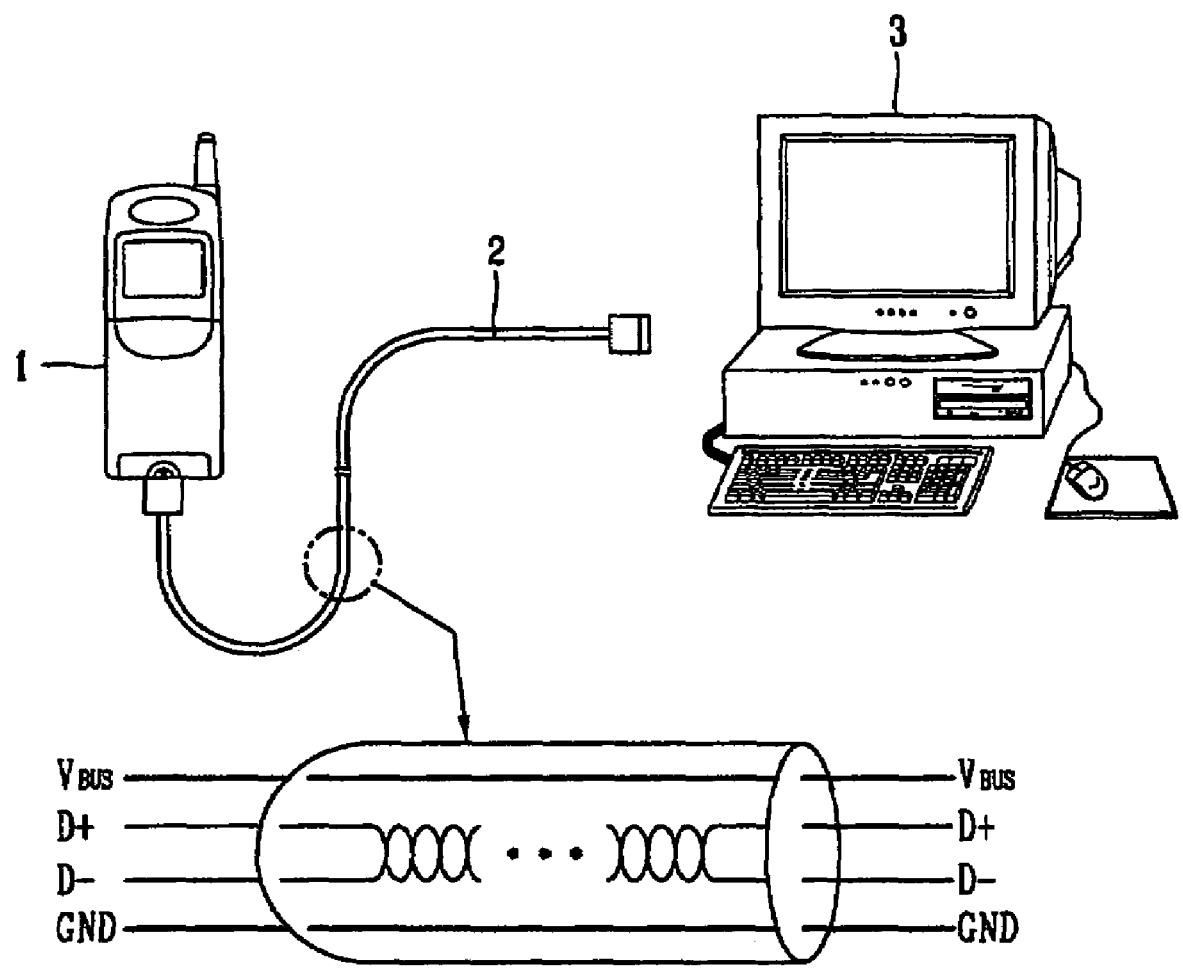
FIG. 1 is a construction view of a data transferring system between a universal mobile communication terminal and a computer in accordance with the related art.
Figure 2:
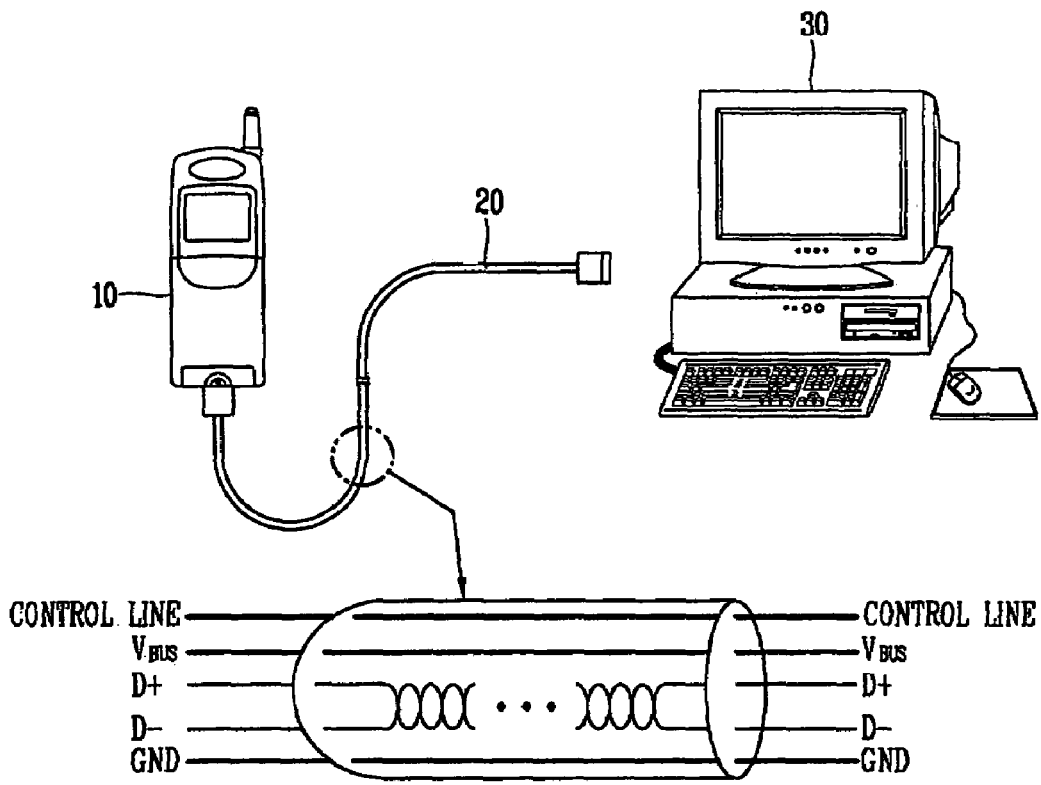
FIG. 2 is a diagram showing a data transferring system using a USB according to one embodiment of the present invention.
Figure 3:
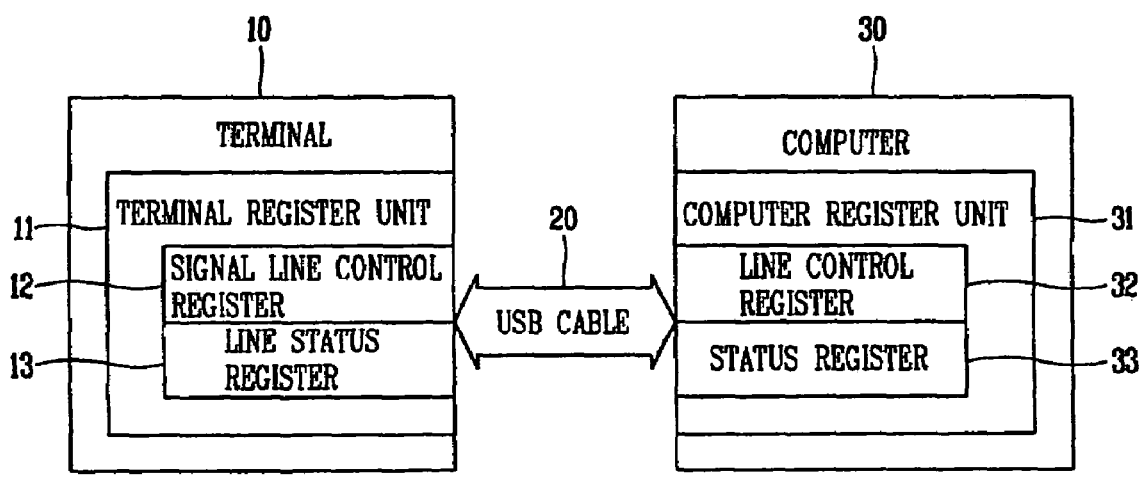
FIG. 3 is a diagram showing a terminal register unit and a computer register unit according to an embodiment of the present invention.

FIG. 2 shows a data transfer system using a USB according to one embodiment of the present invention, and FIG. 3 shows a terminal register unit and a computer register unit which may be used in accordance with this embodiment.

The data transfer system includes a USB cable 20 having a control line, a terminal 10 provided with a data port (not shown) and a terminal register unit 11, and a computer 30 provided with a USB port (not shown) and a computer register unit 31.

The terminal transmits a control signal for data transmission to the control line of the USB cable, by controlling the terminal register unit 11 when data to be transmitted through the USB cable exists.

The computer receives the control signal for data transmission through the control line of the USB cable and then executes a USB reception thread (Rx Thread). Data from terminal 10 is then received during the data transfer process. When the data transfer process is finished, the computer transmits a control signal indicating that the data transfer process is finished to the control line, by controlling register unit 11.

The terminal register unit includes a signal line control register 12 for transmitting a control signal to the computer through the control line of the USB cable, and a line status register 13 for indicating a transmission status of data. A computer register unit 31 includes a line control register 32 for receiving a control signal through the control line of the USB cable, and a status register 33 for indicating a data reception status from the terminal. The terminal register unit and computer register unit are connected to the control line of the USB cable. Operation of the data transferring system will now be explained.

Figure 4:
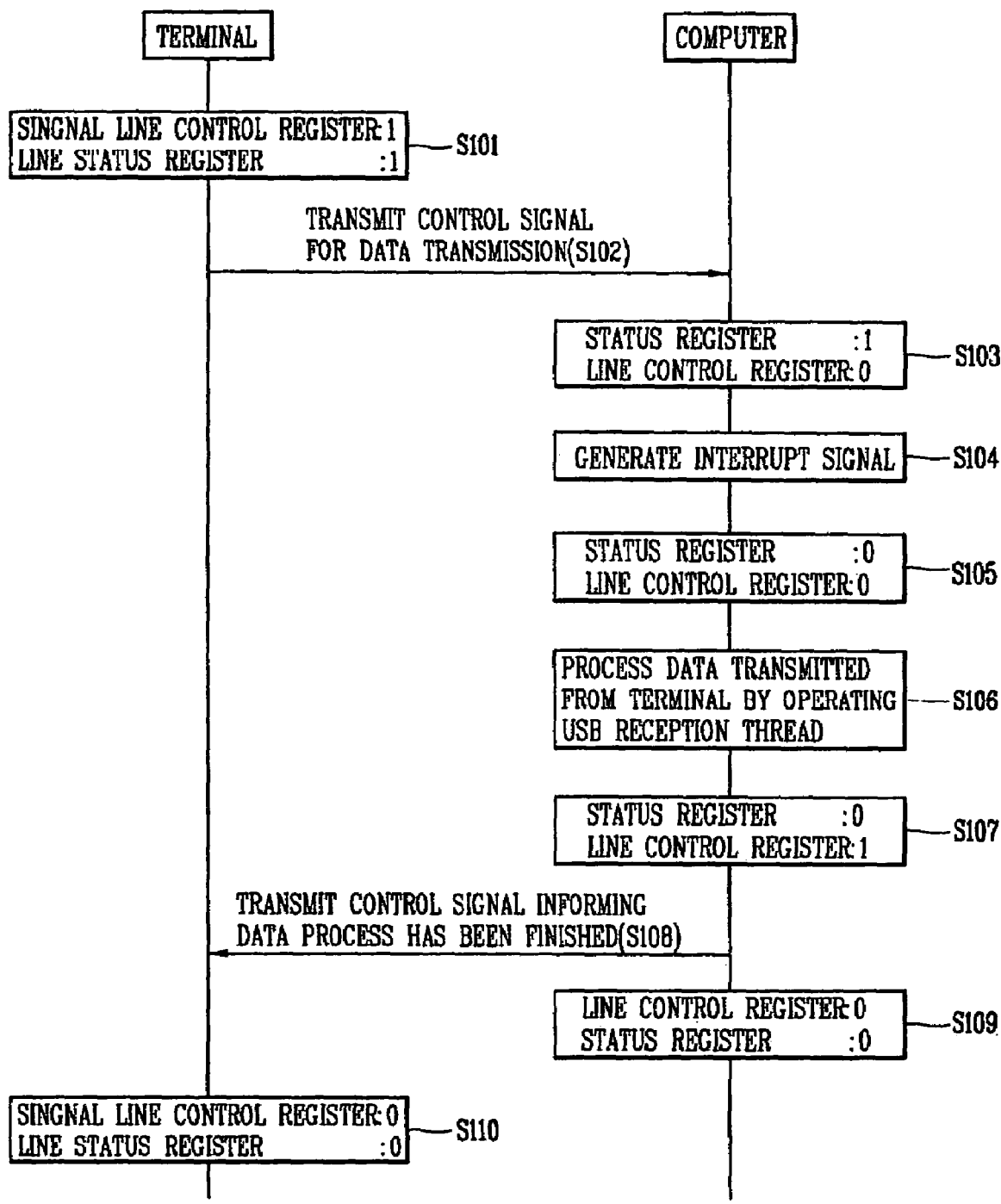
FIG. 4 is a signal flow chart of control registers and status registers of the terminal and the computer according to one embodiment of the present invention.

FIG. 4 is a flow chart showing signal flow that may take place between control registers and status registers of the terminal and the computer according to one embodiment of the present invention. As shown, if data to be transmitted to computer 30 from terminal 10 through USB cable 20 exists, signal line control register 12 and line status register 13 provided at the terminal register unit are set to 1 from 0 (S101). A control signal for data transmission is then transmitted to the computer through the control line of the USB cable (S102). The computer receives the control signal through the control line of the USB cable, and then sets the status register 33 provided at the computer register unit 31 to 1 (S103).

That is, the terminal transmits a + signal to the control line since the signal line control register 12 is 1. The status register 33 of the computer register unit is toggled to 1 from 0 by the + signal. In response to the toggled signal 1 of the status register, an interrupt signal is generated (S104) and the status register is reset to 0 (S105). A PC program that has received the interruption signal as an event executes a USB reception thread to thereby process data transmitted from the terminal (S106).

When the data process (S106) is finished, the line control register 32 is set to 1 (S107) and a control signal indicating that the data process has been finished is transmitted to the terminal through the control line of the USB cable (S108). Then, the line control register 32 is reset to 0 (S109).

If the terminal receives the control signal indicating that a process of the data transmitted form the computer 30 is finished, the signal line control register and the line status register of the terminal register unit are changed to 0 (S110).

That is, setting the line control register 32 of the computer 30 to 1 means that a process of the previously transmitted data is finished. By this setting, the line control register 32 transmits a – signal to the terminal register unit through the control line. When the – signal is transmitted to the terminal register unit through the control line, the line status register of the terminal register unit is toggled to 0 from 1 and the signal line control register is also changed to 0 from 1.

When the line status register is changed to 0, the terminal recognizes that a process of the previous data transmitted to the computer is finished and allows next data to be transmitted. More specifically, data to be transmitted is stored in a buffer of the terminal, and when the line status register becomes 0 the terminal recognizes that a process of the previous data is finished and then next data is transmitted to a transmission data register. When data to be transmitted exists, the terminal repeats the aforementioned process with reference to a value of the line status register.

Thus, in the present invention the control line for controlling the USB reception thread (Rx thread) of the computer is added to the USB cable. Also, the register units 11 and 31 are provided at the terminal 10 and the computer 30, thereby generating an interrupt for performing the USB reception thread at the computer. The computer therefore operates the Rx thread only at the time of receiving the interrupt through the control line.

Since the thread has a different performance time which is preferably divided under control of a kernel, the computer generates an interrupt according to the control signal of the terminal. The computer performs the reception thread only at the time of receiving data, so that other threads not including the reception thread have enough operation time while the reception thread is not performed. Therefore, other threads which do not include the reception thread can be normally operated. That is, by controlling the operation of the USB reception thread, a load applied to the kernel of the computer is reduced.

Values of the signal line control register, the line status register, the line control register, and the status register of the terminal and the computer are not limited to values in the preferred embodiment of the present invention. Also, the structure and values of the register units 11 and 31 provided at the terminal 10 and the computer may be determined by a skilled person and can be varied. Also, the register units can be applied to every system communicating with the computer through the USB cable.

The foregoing embodiments and advantages are merely exemplary and are not to be construed as limiting the present invention. The present teaching can be readily applied to other types of apparatus. The description of the present invention is intended to be illustrative, and not to limit the scope of the claims. Many alternatives, modifications, and variations will be apparent to those skilled in the art.

What is claimed is:

1. A data transfer system, comprising:
a modified USB cable including:
 (a) a power line,
 (b) a first data line,
 (c) a second data line, and
 (d) a control line to control a USB reception thread;
a terminal for transmitting a control signal through the control line for initiating data transmission through at least one of the first data line or the second data line; and
a computer including a circuit to generate an interrupt signal in response to the control signal received through the control line, the computer executing a USB reception thread for processing data transmitted from the terminal through the first or second data lines of the cable in response to the interrupt signal,
wherein the interrupt signal causes control of execution of one or more other threads in the computer to be interrupted and causes a program of the computer to execute the USB reception thread, wherein the interrupt signal is generated only at a time when the control signal is received through the control line from the terminal.

2. The data transferring system of claim 1, wherein a terminal register circuit and a computer register circuit are respectively connected to the control line of the USB cable to control transmission of the control signal.

3. The data transferring system of claim 1, wherein the terminal includes a register circuit having:

a signal line control register which transmits the control signal to the computer through the control line; and a line status register which indicates transmission status of data.

4. The data transferring system of claim 3, wherein the signal line control register and the line status register are respectively set to a first value when data to be transmitted to the computer from the terminal exists, and wherein the terminal transmits a first signal to the computer through the control line of the USB cable to the computer.

5. The data transferring system of claim 4, wherein the computer controls the computer register circuit at the time of receiving the first signal from the terminal through the control line.

6. The data transferring system of claim 4, wherein the first value is one of a 0 or 1 and a second value is the other of the 0 or 1.

7. The data transferring system of claim 1, wherein the computer register circuit includes:

a line control register which receives the control signal through the control line; and a status register which provides an indication of data reception status from the terminal.

8. The data transferring system of claim 7, wherein the computer register circuit toggles the status register to a first value from a second value when the computer receives the first signal from the terminal through the control line, generates the interrupt signal in response to the status register toggling to the first value and then resets the status register to the second value.

9. The data transferring system of claim 7, wherein the computer register circuit sets the line control register to a first value when the computer finishes data transmission from the terminal, transmits a second signal to the terminal through the control line and then resets the line control register to a second value.

10. The data transferring system of claim 9, wherein the terminal includes a signal line control register which transmits the control signal to the computer through the control line and a line status register which indicates transmission status of data, and wherein the signal line control register and the line status register of the terminal are reset to the second value when the terminal receives the second signal from the computer through the control line, and wherein the terminal recognizes that data transmission to the computer is finished when the signal line control register and the line status register are reset to the second value.

11. The system of claim 1, wherein the interrupt signal causes a program of the computer to execute the USB reception thread only at a time when the control signal is received through the control line from the terminal.

12. A data transferring method, comprising:

when data to be transmitted to a computer from a terminal exists, transmitting a first control signal for initiating transmission of the data through a modified USB cable from the terminal to the computer, the USB cable including a power line, a first data line, a second data line, and a control line, wherein the first control signal is transmitted through the control line to initiate transmission of the data from the terminal to the computer through at least one of the first data line and the second data line;

generating an interrupt signal in response to the control signal received through the control line;

interrupting control of execution of one or more other threads in the computer in response to the interrupt signal;

executing a USB reception thread in the computer after generation of the interrupt signal; and transmitting a second control signal from the computer to the terminal through the control line by the computer, the second control signal indicating that data transmission is finished, wherein the interrupt signal is generated only at a time when the first control signal is received through the control line from the terminal.

13. The method of claim 12, wherein the terminal includes a register circuit comprising:

a signal line control register which transmits the control signal to the computer through the control line; and a line status register which indicates transmission status of data.

14. The method of claim 13, wherein transmitting the first control signal for initializing data transmission comprises:

setting a signal line control register and a line status register of the terminal register circuit to a first value; and transmitting the first control signal to the computer through the control line based on the first value set in the signal line control register.

15. The method of claim 12, wherein a computer register circuit includes:

a line control register which receives the control signal through the control line; and a status register which provides an indication of data reception status from the terminal.

16. The method of claim 12, wherein executing the USB reception thread comprises:

toggling a value stored in a status register of a computer register circuit based on the first control signal, wherein the interrupt signal is generated according to the toggled value of status register;

resetting the status register to an initial value; and receiving the data through at least one of the first or second data lines.

17. The method of claim 12, wherein transmitting the second control signal comprises:

setting a line control register to a first value;

transmitting the second control signal to the control line; and resetting the line control register to a second value.

18. The method of claim 12, wherein said each step is repeatedly performed when a value of a line status register of the terminal is changed in response to the second control signal if next data to be transmitted exists.

19. The method of claim 12, further comprising:

changing values stored in registers of the computer and terminal based on the second control signal, said changed values indicating that the data transmission is finished.

20. The method of claim 12, wherein the USB reception thread is executed only at a time when the control signal is received through the control line of the cable.

* * * * *